Patented Jan. 2, 1934

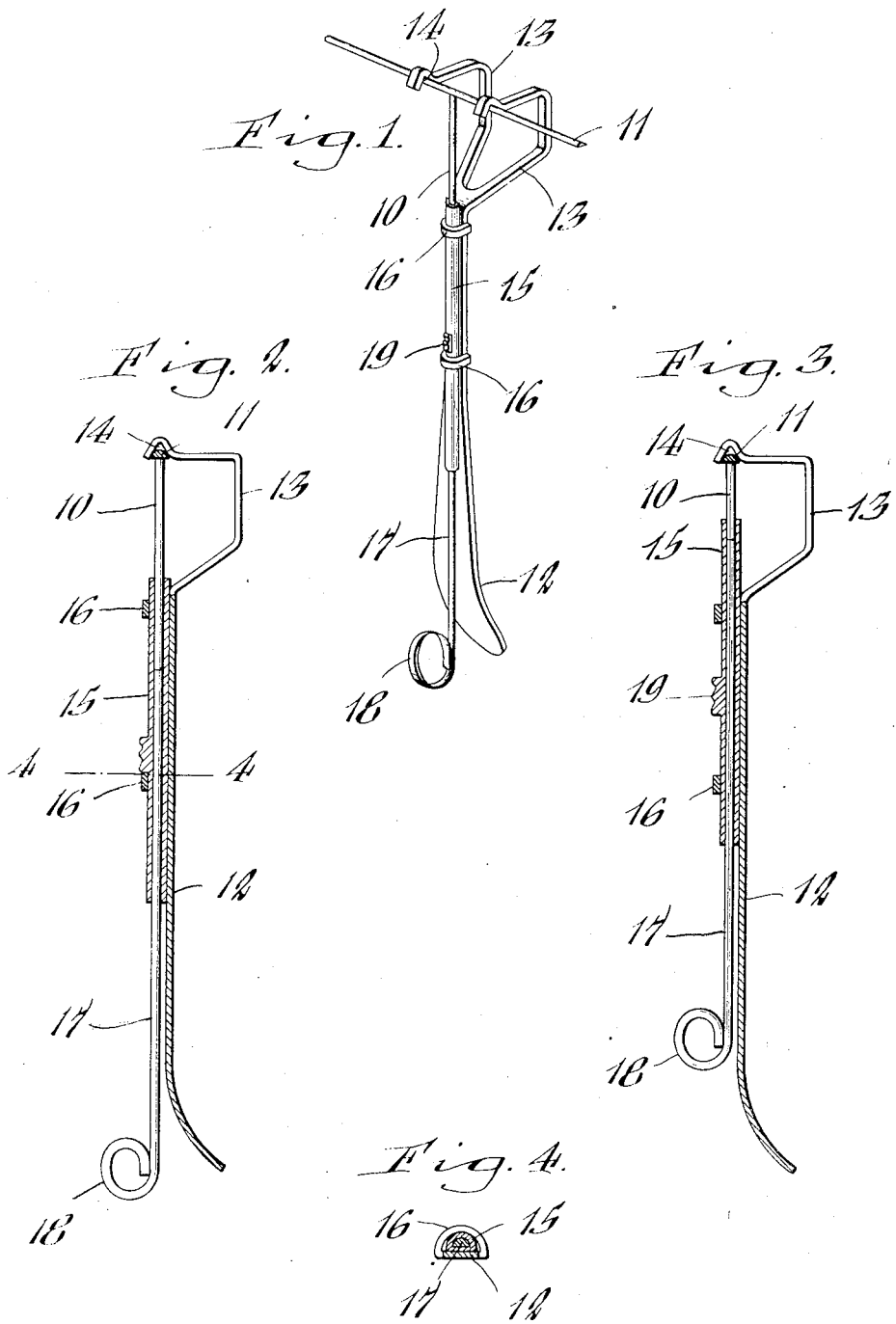

1,941,772

UNITED STATES PATENT OFFICE 1,941,772

SOLDERING JIG

Reginald V. Williams, Buffalo, N. Y.

Application June 1, 1932. Serial No. 614,798

4 Claims. (Cl. 113—99)

This invention relates to a jig or tool which has been designed more particularly for use in certain soldering operations in the art of dentistry.

One of its objects is the provision of a simple and inexpensive tool of this character which is easy to handle and which affords a material saving of the dentist's time in the making of precision or delicate soldering operations.

Another object of the invention is to provide a jig of this character by which rods may be conveniently and accurately soldered to lingual and like wires.

A still further object is to provide a soldering jig which is so designed and constructed as to enable the operator to effect the ready jointing and soldering of the wires or rods, and which is provided with simple means for holding the wires in accurate position for soldering.

In the accompanying drawing:—Figure 1 is a perspective view of a soldering jig embodying my invention. Figure 2 is an enlarged central longitudinal section thereof. Figure 3 is a view similar to Figure 2, but showing the adjustable means for enabling the upright rod to be used completely without waste. Figure 4 is a cross section taken on line 4—4, Figure 2.

Similar characters of reference indicate corresponding parts throughout the several views.

In the preferred embodiment of the jig shown in the drawing, the same has been especially designed for facilitating those soldering operations in the art of dentistry wherein it is desired to solder one wire in accurate right angle relation to another wire, such for example, as the soldering of a half round wire or rod 10 to a labial or lingual base wire 11. To this end, the improved tool or jig consists of a supporting member including a handle 12 which terminates at its outer or front end in a bifurcated portion consisting of substantially hook-shaped arms 13, 13 provided at their free ends with alining seats or notches 14 which are disposed laterally on opposite sides of the longitudinal center line of the supporting member. These seats face inwardly or toward the handle and serve to support the wire 11 in a position at approximately right angles to the direction of length of the tool. As seen in Figure 2, the seats 14 are spaced a suitable distance above the point of junction of the bifurcated arms 13 with the handle.

Mounted lengthwise of the handle 12 is a holder for supporting the wire 10 at right angles to the wire 11. This holder is preferably in the form of a tube or sleeve 15 held in substantially parallel relation to the handle by suitable straps 16. In the drawing, this tube is shown as being substantially half round in cross section to accommodate the customary correspondingly shaped wire or rod 10. Movable relative to the wire-receiving tube is an ejecting rod or plunger 17 terminating at its free end in a handle 18, said ejector serving to project or feed the wire 10 from the tube toward the companion wire 11, the pressure exerted on the ejector serving to hold the vertical wire in abutting relation to the horizontal wire during the soldering operation.

For the purpose of eliminating waste and permitting the use of the entire length of wire 10 supported in the tube 15, I preferably mount the tube so that it is free to slide lengthwise of the handle relative to its retaining straps 16, thereby making it possible to bring this tube closer to the opposing seats 14. Applied to the tube is a finger-engaging projection or lug 19 by which the tube may be conveniently adjusted. In Figure 3, I have shown the tube shifted outwardly relatively to the handle, with the same projecting into the space between the wire-receiving seats 14 and the outer end of the handle, whereby the last section of the wire 10 is fully supported and can be used in the same manner as can the first section used from the wire.

This improved tool is manifestly simple and inexpensive in construction; it is convenient to use; it affords a material saving of time in this particular part of the dentist's work; and it assures an accurate right angle jointing of one wire to another.

I claim as my invention:—

1. A soldering jig of the character described, comprising a handle terminating at its outer end in laterally-deflected, bifurcated portion having laterally-spaced, substantially hook-shaped arms, the free ends of said arms having inwardly-facing seats disposed approximately in the plane of the handle for supporting a wire at substantially right angles to the length of said handle, and wire holding means applied to said handle in parallel relation thereto.

2. A soldering jig of the character described, comprising a supporting member provided at its outer end with inwardly-facing wire-receiving seats, a wire holding tube applied to and shiftable lengthwise on said supporting member toward and from said seats and disposed in a plane between and at substantially right angles to said seats, and an ejector rod slidably fitted in said holding tube for feeding the solder-wire outwardly therefrom.

3. A soldering jig of the character described, comprising a supporting member constituting a handle and provided at its upper end with a bifurcated portion consisting of substantially hooked-shaped arms terminating at their free ends in downwardly-facing wire-receiving seats disposed substantially in the plane of the supporting member and spaced endwise therefrom at opposite sides of said member, and a wire-holding tube disposed lengthwise of the supporting member in a plane intersecting the seats of said bifurcated portion and including means for shifting the wire relative to such portion.

4. A dental soldering jig, comprising a supporting member provided at its upper end with a bifurcated extension having outwardly and thence inwardly bent arms disposed in substantially parallel relation and terminating at their free ends in downwardly-facing, wire-receiving seats, and a wire holder mounted lengthwise on said supporting member in a plane intersecting said seats.

REGINALD V. WILLIAMS.